United States Patent
Shamis et al.

(10) Patent No.: US 10,044,522 B1
(45) Date of Patent: Aug. 7, 2018

(54) TREE-ORIENTED CONFIGURATION MANAGEMENT SERVICE

(75) Inventors: Mark Shamis, Seattle, WA (US); David Emory Watson, Seattle, WA (US)

(73) Assignee: Amazon Technologies Inc., Seattle, WA (US)

( * ) Notice: Subject to any disclaimer, the term of this patent is extended or adjusted under 35 U.S.C. 154(b) by 661 days.

(21) Appl. No.: 13/591,050

(22) Filed: Aug. 21, 2012

(51) Int. Cl.
 *H04L 29/06* (2006.01)
 *H04L 12/44* (2006.01)
(52) U.S. Cl.
 CPC .................................. *H04L 12/44* (2013.01)
(58) Field of Classification Search
 CPC ................................................. H04L 12/2424
 USPC ............................................................ 726/4
 See application file for complete search history.

(56) References Cited

U.S. PATENT DOCUMENTS

| | | | |
|---|---|---|---|
| 5,752,042 A | 5/1998 | Cole et al. | |
| 5,999,740 A | 12/1999 | Rowley | |
| 6,161,125 A * | 12/2000 | Traversat | G06F 9/44505 |
| | | | 707/999.01 |
| 6,449,624 B1 * | 9/2002 | Hammack | G05B 19/0426 |
| 6,725,453 B1 | 4/2004 | Lucas et al. | |
| 7,082,465 B1 | 7/2006 | Martin et al. | |
| 7,139,821 B1 * | 11/2006 | Shah | G06F 8/61 |
| | | | 709/224 |
| 7,290,257 B2 | 10/2007 | Henig et al. | |
| 7,383,534 B1 * | 6/2008 | Agbabian | G06F 8/71 |
| | | | 717/108 |
| 7,418,484 B2 | 8/2008 | Presley | |
| 7,526,479 B2 | 4/2009 | Zenz | |
| 7,533,163 B1 | 5/2009 | Zenz et al. | |
| 7,577,722 B1 | 8/2009 | Khandekar et al. | |
| 7,590,669 B2 * | 9/2009 | Yip | H04L 41/0816 |
| 7,783,733 B1 | 8/2010 | Yip et al. | |
| 7,831,734 B2 | 11/2010 | Bernhard et al. | |
| 8,117,293 B1 * | 2/2012 | Anderson | G06F 8/71 |
| | | | 709/223 |
| 8,316,123 B2 | 11/2012 | Sethuraman et al. | |
| 2002/0095459 A1 * | 7/2002 | Laux | H04L 29/06 |
| | | | 709/203 |
| 2002/0114453 A1 | 8/2002 | Bartholet et al. | |

(Continued)

OTHER PUBLICATIONS

U.S. Appl. No. 11/958,844, filed Dec. 18, 2007, William J. Alford, et al.

*Primary Examiner* — Harris C Wang
(74) *Attorney, Agent, or Firm* — Robert C. Kowert; Meyertons, Hood, Kivlin, Kowert & Goetzel, P.C.

(57) ABSTRACT

Methods and apparatus for a tree-oriented configuration service are disclosed. A system includes computing devices that generate a tree-structured representation of a plurality of configuration elements of a distributed application. The devices implement a programmatic interface allowing a client to request an operation on a configuration element via a network request that indicates a path from a root node of the tree to one or more nodes corresponding to the configuration element. In response to (a) a network request received via the programmatic interface to perform a particular operation on a configuration element associated with a specified node and (b) a determination that authorization information associated with the specified node permits the requested operation, the operation is performed.

24 Claims, 10 Drawing Sheets

(56) References Cited

U.S. PATENT DOCUMENTS

| | | | |
|---|---|---|---|
| 2003/0061622 A1* | 3/2003 | Nebiker | H04L 51/36 |
| | | | 725/117 |
| 2003/0088857 A1* | 5/2003 | Balva | G06F 8/20 |
| | | | 717/137 |
| 2003/0126236 A1 | 7/2003 | Marl et al. | |
| 2003/0188292 A1 | 10/2003 | Herkert | |
| 2004/0002943 A1 | 1/2004 | Merrill et al. | |
| 2004/0119743 A1* | 6/2004 | Xu | G06F 17/30899 |
| | | | 715/760 |
| 2004/0177352 A1 | 9/2004 | Narayanaswamy et al. | |
| 2004/0230971 A1 | 11/2004 | Rachman et al. | |
| 2005/0221818 A1 | 10/2005 | Johnson et al. | |
| 2005/0234931 A1* | 10/2005 | Yip | H04L 41/0816 |
| 2005/0256864 A1 | 11/2005 | Semerdzhiev | |
| 2005/0289538 A1 | 12/2005 | Black-Ziegelbein et al. | |
| 2006/0069743 A1* | 3/2006 | Oommen | H04L 41/0806 |
| | | | 709/217 |
| 2006/0140385 A1 | 6/2006 | Haase et al. | |
| 2006/0161909 A1 | 7/2006 | Pandey et al. | |
| 2006/0218246 A1 | 9/2006 | Fawcett | |
| 2006/0230407 A1 | 10/2006 | Rosu et al. | |
| 2006/0259904 A1 | 11/2006 | Celli et al. | |
| 2006/0282516 A1 | 12/2006 | Taylor et al. | |
| 2007/0011328 A1 | 1/2007 | Srinivasan | |
| 2007/0011494 A1 | 1/2007 | Xie et al. | |
| 2007/0113186 A1 | 5/2007 | Coles et al. | |
| 2007/0180099 A1* | 8/2007 | Tsimelzon | G06F 9/44 |
| | | | 709/223 |
| 2007/0186212 A1 | 8/2007 | Mazzaferri et al. | |
| 2007/0226302 A1 | 9/2007 | Provo | |
| 2007/0233698 A1 | 10/2007 | Sundar et al. | |
| 2007/0234302 A1 | 10/2007 | Suzuki et al. | |
| 2008/0046708 A1 | 2/2008 | Fitzgerald et al. | |
| 2008/0163194 A1 | 7/2008 | Dias et al. | |
| 2008/0295064 A1 | 11/2008 | Mitra et al. | |
| 2009/0040947 A1 | 2/2009 | Krivopaltsev | |
| 2009/0055822 A1 | 2/2009 | Tolman et al. | |
| 2009/0133014 A1 | 5/2009 | Laurila et al. | |
| 2009/0144729 A1 | 6/2009 | Guizar | |
| 2009/0177687 A1* | 7/2009 | Ljungbjorn | G06F 9/4492 |
| 2009/0249215 A1 | 10/2009 | Paek | |
| 2009/0276833 A1* | 11/2009 | Paul | G06F 12/1458 |
| | | | 726/4 |
| 2010/0011342 A1* | 1/2010 | Bhattacharyya | G06F 8/34 |
| | | | 717/120 |
| 2010/0235476 A1 | 9/2010 | Lin et al. | |
| 2012/0317155 A1* | 12/2012 | Ogasawara et al. | 707/812 |
| 2015/0006458 A1* | 1/2015 | Zadka | G06N 5/022 |
| | | | 706/47 |

\* cited by examiner

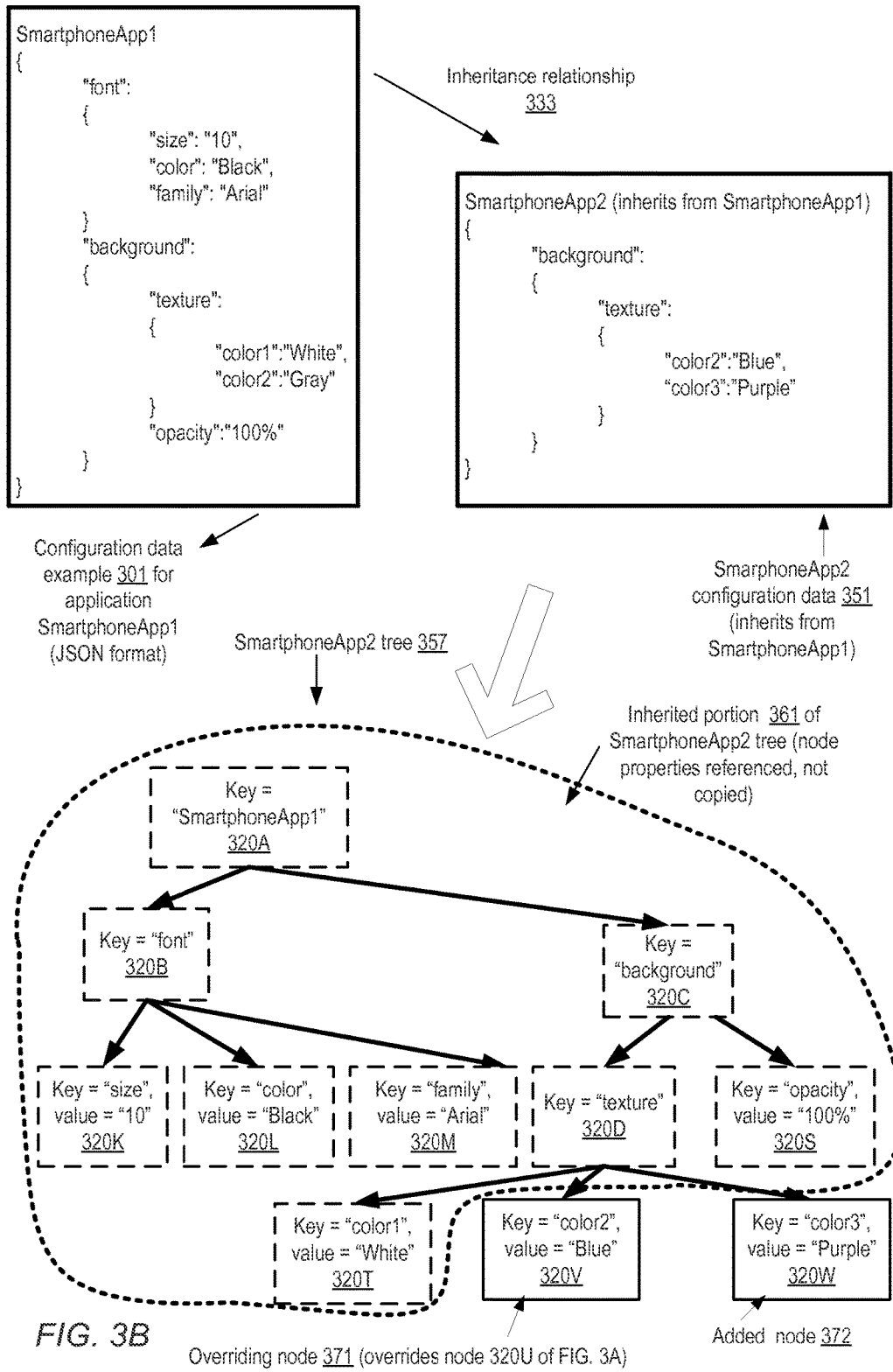

TREE-ORIENTED CONFIGURATION MANAGEMENT SERVICE

BACKGROUND

Many companies and other organizations deploy large-scale distributed applications across numerous execution platforms to provide various types of services to their internal and external customers. For example, some organizations may set up complex, multi-tier applications that use dozens or even hundreds of virtualized compute servers and/or storage servers, potentially spread over many different geographically distributed data centers, for access by customers over public and/or private network connections. Various components of such applications may interact with one another to respond to customer requests—e.g., a web server instance of a multi-tier web application may interact with an application server instance or a database server to produce the results requested from a client browser. The behavior of the different application components (e.g., the perceived responsiveness to end-user requests) may in many cases be sensitive to the value of various configuration parameters. Another application deployment model that has gained traction in recent years involves the download and deployment of relatively self-contained application instances or modules to large numbers of mobile devices such as smart phones, tablets and the like. In some approaches, each instance of a mobile application may have its own set of configuration settings, such that changing settings may require re-deployment or re-installation of the application.

Depending on the complexity of the functionality supported by a given distributed application, and the different types of resources used by the application, a substantial amount of configuration information may be required to manage and control the various components of the application. Historically, different application vendors have taken their own approaches towards configuration management. A few application providers, such as vendors of some database management systems, provide fairly sophisticated proprietary tools to configure and monitor their applications. Such vendor tools may, however, themselves require a steep learning curve before administrators new to the tools can become effective. Other vendors rely on approaches such as text configuration files in various formats, which may become hard to parse and understand for non-trivial application sizes.

For some kinds of applications, it may in general be desirable to ensure consistent configuration of each of multiple application instances or components, while at the same time being able to support non-standard configurations for some subset of the instances or components. For example, one network-intensive application may be deployed to a hundred servers in a data center, of which ninety servers use one type of network interface card (NIC), five servers happen to use a different NIC, and five servers happen to use a third NIC. The general goal for this application may be to have a common NIC configuration for all the servers where the application is running, assuming the most common NIC is in use, while also being able to configure the less common NICs when needed. If a new version of the application is released, which requires different settings for the different NIC types, administrators may in some environments have to manually track down exactly which changes are needed at which servers, and then apply the changes, which may be an error-prone process. The problem of efficiently implementing desired changes to configurations may be even more of an issue for mobile applications which can potentially be deployed at hundreds of thousands, or even millions, of smart phones or tablets. For information technology (IT) departments whose staff has to potentially manage hundreds of different applications, the widely different approaches taken to configuration management by the different applications can lead to substantial costs—e.g., due to inadvertent less-than-optimal configuration settings, or manual replication effort required to try to maintain consistent configurations.

BRIEF DESCRIPTION OF DRAWINGS

FIG. 3B illustrates an example of a configuration tree whose nodes inherit properties from nodes of another tree, according to at least one embodiment.

Figure 1:
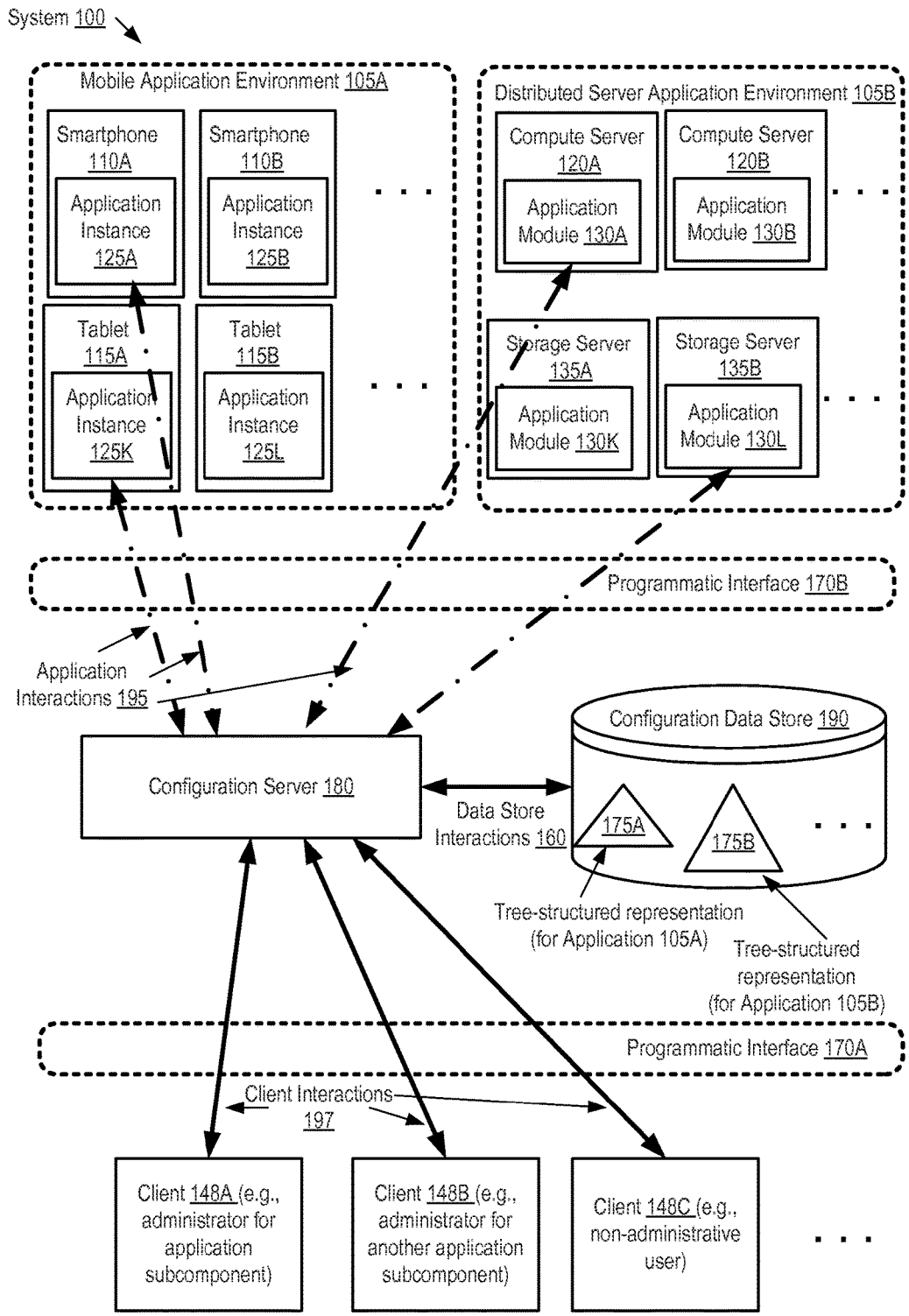
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a tree-oriented configuration management service are described. In at least some embodiments, the service may be multi-tenant, in that a configuration server implementing the service may be capable of representing, storing, and providing concurrent access to configuration information of a plurality of independent applications of different types and complexities. Although at least some of the various independent applications may have been developed by different vendors (or different development groups within the same organization) with different approaches towards configuration management and configuration information storage, the multi-tenant service may take a common approach in which configuration information for any type of application may be organized as a tree in some embodiments, with a unified, easy-to-use set of interfaces. According to one such embodiment, the configuration server may, based on input received from any combination of configuration data sources as described below, generate and store a tree-structured representation of a plurality of configuration elements of an application. The term "configuration element" may be generally used herein to represent any configuration-related datum that has an identifier and at least one corresponding value—e.g., the maximum size of an in-memory heap of a virtual machine instance (with an identifier of the form "VM-<VM-ID>.MaxHeapSize" and a values such as "4 GB"), the background color of a portion of a smartphone application screen layout (with an identifier of the form "PhoneApp-<AppName>.layout.bgcolor" and a value "Yellow"), and so on. The tree representation may include a plurality of non-leaf nodes (including a root node) and a plurality of leaf nodes, connected via parent-child edges. Each non-leaf node may represent a respective collection of configuration elements (with the root node, for example, representing an entire application or application instance) that are linked directly or indirectly to the non-leaf node via the edges, and each leaf node may represent a respective configuration element.

A number of different types of tree data structures may be used in different embodiments for the representation. In some implementations, each node may have only a single parent in the tree, except for the root node which has no parents; in other implementations, some nodes may have more than one parent node representing multiple logical containment relationships. In some embodiments, the tree-structured representation may include sibling edges linking related configuration elements or collections, in addition to parent-child edges. For example, if an application comprises four application server instances configured as a cluster, in one implementation a non-leaf node representing the cluster may have four parent-child edges leading to respective nodes representing the four instances, and each instance node may have one or more sibling edges leading to the other instance nodes. In at least one embodiment, the configuration server may store, for a given node of the tree, one or more of: (a) a key that identifies one or more configuration elements associated with the given node (the element represented by the node, and/or a set of elements that are represented by a sub-tree rooted at the node) (b) a value of a configuration element associated with the given node and (c) various kinds of metadata for a configuration element associated with the given node. For non-leaf nodes, in some embodiments, a value may not be stored, as the non-leaf node may simply represent a parent container for other key-value elements. In some implementations, and for certain kinds of applications, the key may serve as the value—i.e., there may be no need to store a value distinct from a key for a given configuration element. Details regarding the kinds of metadata that may be stored for a given node in various embodiments are provided below.

In some embodiments a given node or sub-tree of a given tree may inherit one or more of its properties from a different node or sub-tree, either of the same tree or of a different tree. For example, a client may wish to construct a new tree N that is largely similar to an existing tree E, where N is intended to represent the configuration of a similar application to the application represented by E, with just a few configuration differences between the two applications. In such a scenario, the client may be able to indicate that N "inherits from" E (or that the root node of N inherits from the root node of E) in some embodiments. E (or its root node) may be termed the "source" or "parent" in the inheritance relationship, and N (or its root node) may be termed the "target" or "child". As a result of the inheritance indication, various properties of N and its nodes (such as the structure of the tree, the values of various configuration elements represented by the nodes, and/or at least some of the metadata of the nodes) may be derived from the source tree E via pointers or references, instead of the configuration server or the client having to copy the source tree E. Inherited properties may be overridden as needed in some embodiments—e.g., the client may provide new keys, values or metadata for some of the nodes of N that differ from the properties of the corresponding source nodes in E. Inheritance may be used within a single tree (e.g., for generating similar sub-trees) and/or across different trees in some implementations. The support for inheritance may be especially useful in scenarios where a given application's lifecycle includes multiple phases, such as an alpha phase, a beta phase, a gamma phase and a production phase. In such an environment the configuration trees for the different phases may differ only slightly, making inheritance very efficient (e.g., because duplication of configuration information can be avoided). In some embodiments, it may be possible for an administrator or other client to indicate (e.g., as part of the metadata for a tree, sub-tree or node) that some or all nodes of a given tree are to be considered "stable" or "available for inheritance", indicating that changes to those nodes are not expected to be frequent (or not expected at all). It may be safer for clients to inherit from such stable trees or nodes, in that the inheriting trees or nodes would be less likely to be affected by changes in the source tree or nodes.

In at least one embodiment, the configuration server may store authorization information for one or more nodes of the tree. The authorization information for a particular node may include, for example, a collection of one or more (entity, allowed operations) entries. Each such entry may indicate one or more operations that an entity (such as an administrator with a particular user identifier, a group of users, or a specified executable application component, or a computing device with a specified identifier) is allowed to perform on one or more of the configuration element associated with the particular node. Some authorization entries may indicate permissions that are limited to a single node, while other entries may indicate permissions that cascade down to a sub-tree of the node to which the entry is linked. In some embodiments, the authorization information may be stored as part of the metadata of the node; in other embodiments, at least a portion of the authorization information may be stored and/or managed by a separate authorization service, and the configuration server may utilize the authorization service when determining whether a requested operation is to be initiated or disallowed. The authorization-related functionality of the configuration server may utilize features of an identity management service, e.g., an LDAP (Lightweight Directory Access Protocol) or an Active Directory service, in some implementations—for example, the user names and group names to which various node permissions are granted may be obtained from such a service, and/or at least some of the tree's authorization entries may be stored in the identity management service. In one embodiment, the authorization information may indicate denied operations, in addition to or instead of indicating allowed operations.

The configuration server may implement a number of different programmatic interfaces (e.g., application programming interfaces (APIs), web site pages, command-line tools, graphical user interfaces and the like) in different embodiments, allowing various clients to request operations on one or more configuration elements represented in the tree. A number of different operation types affecting different sub-portions of the tree may be supported in various embodiments, including for example read operations, modifying operations (creates, updates, renames, moves, or deletes), any of which may be directed at single nodes of the tree, or multiple nodes such as all the nodes of an entire sub-tree. That is, a single operation request may be targeted at a sub-tree or at one or more tree nodes. In one implementation, one programmatic interface may be configured to receive network requests directed to a particular Uniform Record Locator (URL) or Uniform Record Identifier (URI) maintained for the configuration server. Each network request may indicate the configuration elements on which operations are requested by specifying one or more paths from a root node of an application's tree to one or more nodes corresponding to the targeted configuration elements. For example, in one implementation a request to read the value of a configuration element "max_threads" of a particular instance "instance1" of an application server cluster "app1cluster" of a multi-tier application "MTApplication-A" whose configuration information is accessible from a URL http://website.com/configServer may identify the element using the path "MTApplication-A.app1cluster.instance1.max_threads" and provide that path in a query directed to the URL. If simple HyperText Transfer Protocol (HTTP) GET calls are used in such an implementation for read requests, the client may submit a "GET http://website.com/configServer/MTApplication-A.app1cluster.instance1.max_threads" request to obtain the desired value. Both human users (e.g., administrators or managers of the applications whose configuration information is being represented in tree form) and executable program components (e.g., portions of the executable code of the applications) may use the programmatic interfaces in some embodiments. The tree representation may be rendered in such a way as to support different levels of abstraction for different parts of the configuration space—e.g., an administrator interested in the details of a storage device configuration may be provided with a view of the tree where only the storage-related sub-tree is rendered in detail, while other parts of the tree are displayed with fewer details.

In response to receiving a network request requesting an operation (such as a read or a write) on one or more configuration elements via one of the programmatic interfaces, the configuration server may determine, using the authorization information for the appropriate nodes of the tree, whether the requesting entity has the required permissions. In at least some embodiments, the configuration server may include a concurrency controller component to manage concurrent requests—e.g., some types of concurrent modifications may be allowed if the to-be-modified nodes are not in an ancestor-descendant relationship, as described below in further detail. If the authorization information permits the requested operation(s), and if the requested operations do not cause concurrency conflicts, the requested operations may be initiated. If the operations cannot be performed, either due to lack of sufficient permissions or due to access conflicts, in some implementations the requester may be informed of the reason. In other implementations, the request may simply be ignored. In some embodiments, instead of rejecting a modification request outright due to a detected conflict with another concurrent modification, the configuration server may simply defer the request until the conflict no longer exists, or inform the requester to resubmit the modification request later.

As noted above, requests from both human clients and executable clients may be supported via a combination of programmatic interfaces in some embodiments. Configuration changes may be propagated to the appropriate components using subscription-based notifications in some embodiments—e.g., when a configuration change is made by an administrator, the configuration server may identify a set of subscribed application instances or components and send a message to them (e.g., to a persistent message queue from which the instances or components can retrieve the notifications). Instances or components of the application may, in some implementations, submit requests to read portions or all of the application's configuration information periodically to ensure that any updates that may have been performed (by other clients of the configuration server) are recognized and acted upon. Such periodic configuration checks may be performed, e.g., as a backup mechanism to reduce the probability of loss of configuration change information, even if a subscription-based technique is also in use in some embodiments. In one implementation, if an executing application component detects an unexpected event or application state, the component may be configured to obtain the latest relevant configuration information from the configuration server via a request to read the corresponding node(s) or sub-tree. Thus, in various scenarios, application components may be allowed to obtain configuration changes as and when needed, instead of for example having to redeploy or restart when an administrator makes a change.

As noted above, in at least some embodiments, metadata may be stored for some or all of the nodes of an application's configuration tree. The metadata for a given node may comprise any combination of a number of different constituent components in various embodiments, such as one or more of: (a) a time at which a value of a configuration element associated with the given node changed (b) an identification of an entity that changed the value of a configuration element associated with the given node (c) a previous value of the configuration element associated with the given node (d) a validity expiration time for a value of a configuration element associated with the given node (e) subscriber information identifying the circumstances under which one or more entities are to be notified when the key, value or metadata of the given node changes, and the notification mechanisms to be used (f) authorization metadata for the configuration element of the node or for the elements of its sub-tree or (g) custom or user-defined metadata such as tags or labels that a client may wish to associate with the given node. An example of a tag or label that may be used in embodiments where inheritance is supported is a tag that indicates that a node is "stable", i.e., further changes to the node are expected to be infrequent.

In one embodiment, the configuration server may be configured to translate the configuration information for an application from one format to another as needed. For example, one client may wish to obtain a representation of a particular sub-tree of an application's configuration in an XML (Extensible Markup Language) format, and another client may wish to obtain a representation of the same sub-tree (or a different sub-tree) in a JSON (JavaScript™ Object Notation) format, or in a CSV (comma-separated value) format. In such an embodiment, the configuration server may be capable of presenting configuration information obtained from its internal tree representation to any of a supported set of formats. The configuration server may also be configured to take as input a configuration file in any of a number of different formats including CSV, XML, JSON, YAML, and the like, and converting the configuration information into a tree representation. In at least one such embodiment, when an administrator or other client wishes to make a configuration change to an application, a text file indicating the change in one of the supported formats may be provided to the configuration server. The configuration server may parse the input, identify the nodes of the corresponding tree representation that need to be modified, and make the necessary changes. In embodiments where application components, administrators or other clients may subscribe to be notified when configuration changes occur, the configuration server may transmit appropriately-formatted notifications to each appropriate subscriber. A programmatic interface specifically for subscription-related requests (e.g., requests in which clients specify their nodes of interest, for frequently or under what conditions they wish to be notified, and the notification mechanisms to be used) may be implemented in some embodiments.

The configuration server may choose to store the tree-structured representations of application configuration in any of a number of different types of data repositories in various embodiments. In one embodiment, for example, a non-relational, flexible-schema ("NoSQL") database may be used, in which the value and/or metadata for a given configuration element may be stored in respective columns of a database object row uniquely identified by the key for the corresponding node of the tree. Other columns may be used to store parent pointers, child pointers or sibling pointers to other nodes. In other embodiments, an object oriented database may be used, where each node of the tree is represented by a different object. A relational database may be used in some embodiments, in which for example the value and metadata for each configuration element is stored in a respective row. In one implementation, the entire tree for a given application may be mapped to a single row of a relational database table, with all the element keys, corresponding values and metadata being stored in respective columns. In some implementations, instead of using a database, a file system may be used, in which the information about each configuration element is stored in a respective file, and the tree is mapped to a directory hierarchy. Independent of the specific type of data store used, the configuration information for any given application in various embodiments may be made accessible to clients in the form of a tree-structured hierarchy, and the details of the actual underlying storage model being used may not be revealed to clients. In some implementations where the underlying storage mechanism provides its own concurrency control (such as lock managers for certain types of databases), the configuration server may superimpose its own concurrency control module on top of the underlying concurrency control components to implement the desired types of concurrent modifications—e.g., the configuration server may use a database system's row and/or table locks as needed to manage concurrent accesses to various tree nodes.

The unified approach of using tree-structured representations of configuration information for applications of varying complexity may simplify application administration substantially in some environments. For example, the hierarchical view resulting from a tree representation that supports different levels of abstraction may allow administrators to understand the relationships between different parts of a complex application more easily than if the relationships had to be discerned by analyzing long text files where every entry appears to be of equal importance. Furthermore, a configuration server that supports subscription-based notifications of configuration changes may significantly improve customer satisfaction, e.g., for applications that might otherwise require redeployment for configuration changes to be propagated.

Example System Environment

FIG. 1 illustrates an example system environment, according to at least some embodiments. System 100 comprises a plurality of application environments 105, including a mobile application environment 105A and a distributed server application environment 105B. Each application environment 105 comprises a plurality of execution platforms of a distributed application. For example, mobile application environment 105A comprises a plurality of smartphones 110, such as 110A and 110B, and a plurality of tablet computing devices 115, such as tablet 115A and 115B. Each of the smartphones 110A and tablets 115 includes a respective application instance 125, such as instance 125A on smartphone 110A, instance 125B on smartphone 110B, instance 125K on tablet 115A and instance 125L on tablet 115B. The distributed server application environment 105B comprises a plurality of compute servers 120, such as 120A and 120B, and a plurality of storage servers 135, such as 135A and 135B. Each of the compute servers 120 and the storage servers 135 includes a respective application module 130 of the distributed server application—e.g., compute server 120A includes module 130A, compute server 120B includes module 130B, storage server 135A includes module 130K, and storage server 135B includes module 130L. System 100 includes a configuration server 180 in the depicted embodiment, configured to generate, store, and provide client access to tree-structured representations of configuration information pertaining to various applications, including the mobile application whose instances 125 run on the depicted mobile phones 110 and tablets 115, as well as the distributed server application whose modules run on the compute servers 120 and the storage servers 135. The configuration server 180 of the depicted embodiment may be capable of managing configuration information for applications with different designs and deployment architectures, not limited to the two types of application environments depicted. For example, in addition to application architectures where similar or related application units or instances are deployed to a number of devices (such as the mobile application environment 105A shown), and application architectures where different components or modules of the application may be deployed to different devices (such as the distributed server application environment 105B), configuration server 180 may also manage configuration information for a monolithic (single instance) application deployed in its entirety on a single device, dynamically deployed applications where the number of computing devices participating in application execution varies over time as the workload level changes, hybrid applications where some components run on small mobile devices or sensors while other components run on servers, and so on.

In the embodiment depicted in FIG. 1, configuration server 180 generates tree-structured representations of various applications, such as tree-structured representations 175A and 175B for application environments 105A and 105B respectively, and stores the representations in a configuration data store 190. Each tree 175 comprises a plurality of leaf nodes, representing respective configuration elements of the application, and a plurality of non-leaf nodes representing collections of configuration elements. The information stored for each node of the tree may include an identifier or key for the configuration elements associated with the node (i.e., the element represented by the node, or the elements represented by the child nodes of the node). For at least some nodes the configuration manager 180 may store one or more values for the associated configuration elements, as well as metadata for the associated configuration elements. In at least some embodiments, the configuration server 180 may comprise a plurality of computer servers and/or other computing devices, as a single computer system may not meet desired performance and/or availability requirements.

A number of different clients 148, such as application component administrators 148A and 148B, or non-administrative users 148C, may utilize a client-side programmatic interface 170A to submit requests for various read or modifying operations on the application configurations in the depicted embodiment. The various application instances and/or modules whose configuration is being managed, such as instances 125 and/or modules 130, may also interact with the configuration manager 180 in some embodiments, e.g., using programmatic interface 170B. These executable components may, for example, contact the configuration server 180 periodically or in response to notifications to obtain configuration change information, or to obtain guidance when an unusual event such as the deployment of a new hardware or software component on the execution platforms is detected.

In at least some embodiments, authorization information may be stored for at least some of the nodes of the trees 175, indicating which specific types of operations various clients 148 and/or executable application modules 130 or instances 125 are permitted (or not allowed) to perform. When the configuration server receives an operation request identifying one or more requested operations, identifying the nodes of the trees 175 on which the operations are to be performed (e.g., via a path from the root of the tree), the authorization information for the nodes may be checked to determine whether the operations are permitted or not. If the requested operations are permitted, and (at least in the case of some modifying operations) if the operations do not conflict with other concurrent or ongoing operations, the configuration server 180 may initiate or perform the operations. If modifying operations are requested and approved, the configuration server 180 may commit one or more changes to the data store 190, as indicated by the arrow labeled 160 in FIG. 1. In some embodiments, changes to the configuration information, which may be initiated either at client request, may result in notifications to one or more execution platforms or to other clients, depending on which set of devices or users subscribe to be notified when configuration changes occur. Thus, application interactions 195 and/or client interactions 197 may each also comprise subscription requests and/or change notifications in some embodiments. Further details regarding various aspects of the functionality of configuration server 180 in various embodiments, such as the different types of data sources that may be used to generate and populate the tree representations, and the different data models that may be used for storing the tree representations, are provided below.

Tree Generation and Node Population

Figure 2:
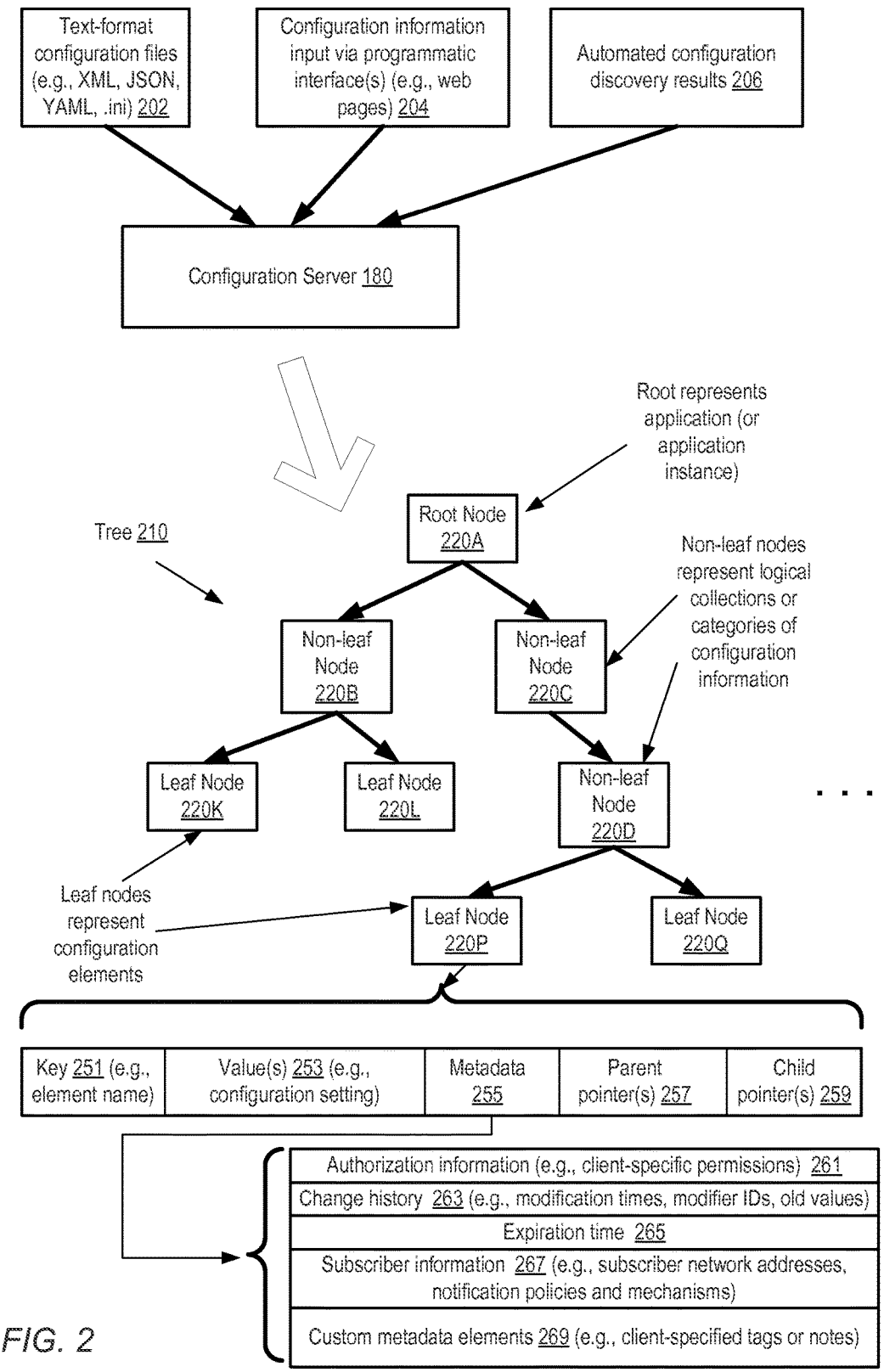
FIG. 2 illustrates examples of the type of the information stored for various nodes of a tree-structured representation of an application's configuration, according to at least some embodiments.

FIG. 2 illustrates examples of the type of the information stored for various nodes of a tree-structured representation of an application's configuration, according to at least some embodiments. To generate the tree, configuration server 180 may obtain configuration information from a number of different configuration data sources in various embodiments. In one scenario, an administrator of an application may supply one or more configuration files 202 in a text format, such as an XML, JSON, YAML, or .ini file to the configuration server 180 for a given application. The configuration server 180 may parse the supplied file, identifying the tree nodes to be generated and the edges that should link the nodes. Configuration information may also be provided to the server 180 via one or more programmatic interfaces, such as web pages or APIs, as indicated by element 204 of FIG. 2. In addition, in at least some embodiments the configuration server 180 may be configurable to obtain configuration data via automated discovery, as indicated in element 206. For example, the configuration server may be given a network address and credentials to access a particular software or hardware component of the application, and may be able to automatically discover configuration information about the component via one or more network calls using the provided credentials. In at least one embodiment, combinations of the three approaches shown may be used: e.g., a text configuration file may be provided to the configuration server for an initial tree to be generated for an application, and input about subsequent changes to the configuration may be provided using a programmatic interface.

Using the configuration information obtained from any combination of the various types of data sources depicted in FIG. 2, the configuration server may organize the information in a hierarchy to generate a tree-structured representation 210 of the information. The root node 220A of the tree may represent the application as a whole (or in some cases, an instance of an application). The non-leaf nodes such as 220B, 220C and 220D may represent collections of configuration elements, and the leaf nodes, such as 220K, 20L, 220P and 220Q may represent individual configuration elements. The directed edges shown in FIG. 2 represent parent-child relationships between the nodes linked, e.g., node 220C is a parent of 220D, 220B is a parent of 200L, and so on. The set of nodes reachable from a given non-leaf node N by following one or more parent-child edges of the tree may be referred to as the "descendant" nodes of node N, and node N may be referred to as an "ancestor" of the descendant nodes. Thus, in the depicted embodiment, all non-leaf nodes may have one or more descendants, and all nodes except the root node may have one or more ancestors. The information stored for a given leaf node (such as 220P in the illustrated example) may include several entries. A key 251 such as an element name or identifier may be stored as one of the entries for the node. In some implementations, duplicate node names may be allowed, and a unique numerical or string identifier different from the node name may be generated to serve as a key for each node. One or more values 253 may be stored for the configuration element represented by the node in some embodiment. Values 253 may be stored in any desired format or data type in various embodiments, such as numerical integer or floating point values, strings, binary objects, arrays or collections of values, and so on. Various types of metadata 255 for the configuration element may be stored in some embodiments.

Other entries for a given node 220 may store parent pointer(s) 257 and/or child pointer(s) 259, representing the edges of the tree.

The metadata 255 for a node 220 may include client-specific authorization information 261 (such as a list of operation types permitted on the node for a client or a group of clients) in some embodiments. The authorization information of a given node may be restricted to that node in some implementations, or may apply recursively to other nodes that are part of a sub-tree rooted at the given node (unless explicitly overridden by authorization information specific to a particular descendant node in the sub-tree). In at least one implementation, change history 263 for the node may be included in metadata 255. Change history 263 may in some implementations indicate when the node (i.e., any of the entries associated with the node, such as the key 251, values 253, metadata 255, or pointers 257 or 259) was modified or created, which entity modified the node, and what the previous values of the modified entries were. Depending on the implementation, change history information may be retained either for just the most recent change, or for a number of changes. In at least one embodiment, a change history entry for a non-leaf node may indicate changes performed in the sub-tree rooted at the node, and not just changes at the non-leaf node itself—e.g., information about changes made in a sub-tree may be "rolled up" to the root of the sub-tree. An expiration time 265 or validity period of the node's value(s) may be stored in some embodiments.

As noted above, in some embodiments changes made to the application configuration may need to be propagated to various application instances, components or devices, and a subscription model may be used to determine which entities are to be notified when configuration changes occur. The metadata 255 for a given node 220 may include subscriber information for that node in such embodiments, indicating for example subscriber network addresses, the notification policies to be used for each subscriber (e.g., one subscriber may wish to receive accumulated change information collected over a specified period such as a day, while another may wish to be notified whenever any change is made to the node), and the specific notification mechanisms (such as a particular HTTP POST message, a message to a specified queue, an e-mail, a log file entry, or a text message) to be used for the various subscribers. Node metadata 255 may also include custom metadata elements 269 in some embodiments, such as tags, labels or notes in any desired format that a client may wish to attach to a node. Various other metadata entries may be maintained for the tree nodes in some embodiments. In some implementations, some or all of the data stored for a given node may be kept in a different storage object than the tree itself—e.g., the node keys and values may be stored in one NoSQL table, together with pointers to the metadata, which may be stored in a different table or tables.

Figure 3A:
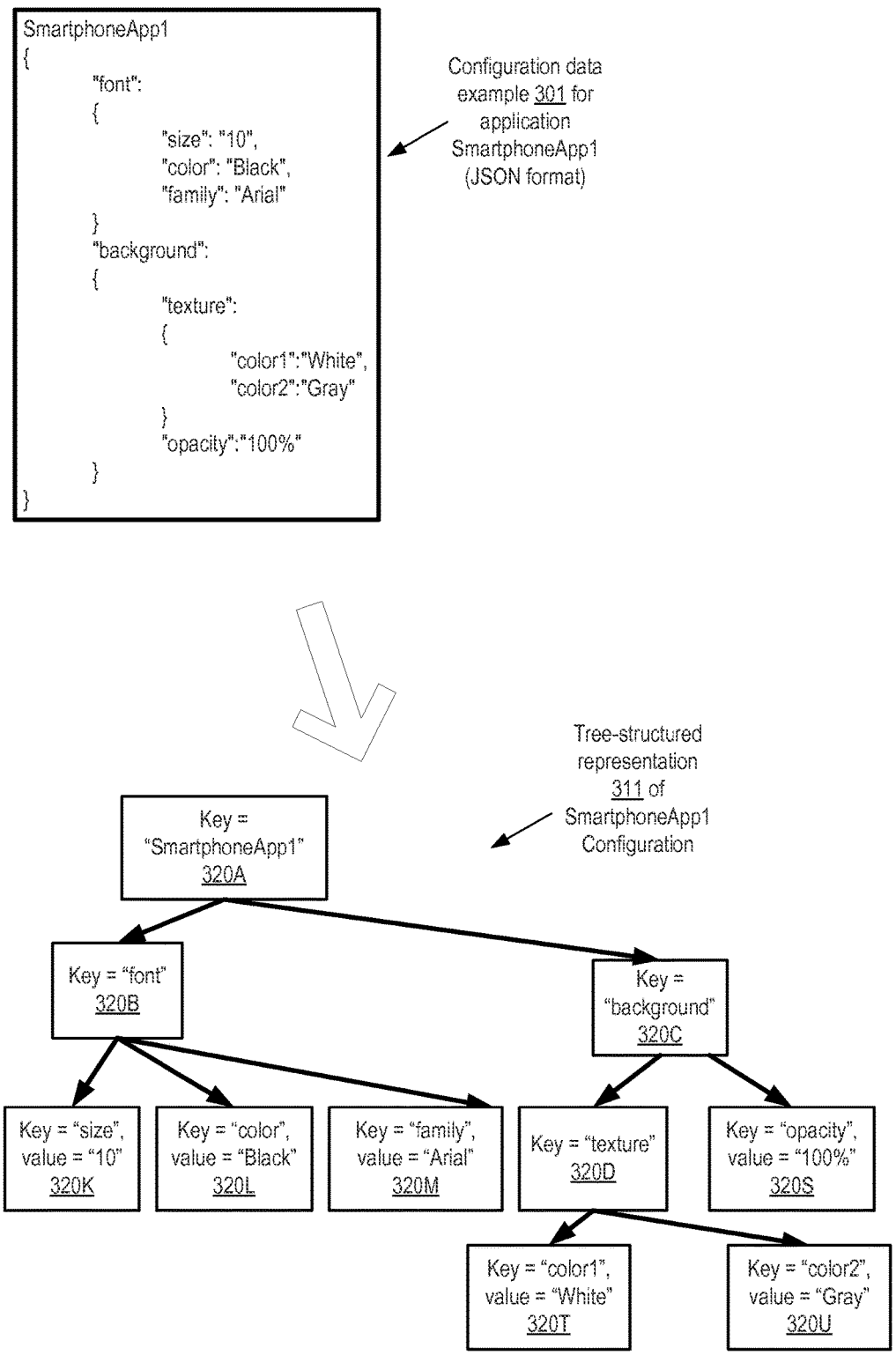
FIG. 3A illustrates an example configuration tree that may be generated corresponding to a portion of a JSON configuration file, according to at least some embodiments.

FIG. 3A illustrates an example configuration tree that may be generated corresponding to a portion of a JSON configuration file, according to at least some embodiments. In the depicted example, configuration data 301 for a smart phone application "SmartPhoneApp1" is supplied to configuration server in JSON format, e.g., by an administrator or web developer. Only a portion of the configuration file is shown in FIG. 3 for clarity, together with the corresponding portion of the tree representation 311.

The illustrated portion of the JSON file for the application comprises several configuration data elements related to fonts and background of the SmartPhoneApp1 application. Accordingly, the configuration server 180 generates a tree 311 with a root node 320A with key "SmartPhoneApp1", and two child nodes of the root: node 320B with key "font" and node 320C with key "background". The sub-tree rooted at node 320B comprises three leaf nodes: node 320K (key="size", value="10"), node 320L (key="color", value="black"), and node 320M (key="family", value="Arial"). The sub-tree rooted at node 320C comprises another sub-tree rooted at non-leaf node 320D (key="texture"). Node 320D's sub-tree comprises two leaf nodes 320T and 320U with respective keys "color1" and "color2" and respective values "White" and "Gray". In addition, node 320C's sub-tree also includes leaf node 320S with key "opacity" and value "100%". In addition to the illustrated keys and values, metadata 255 comprising various entries of the types discussed above may also be stored for each of the nodes in the depicted embodiment.

FIG. 3B illustrates an example of a configuration tree 357 whose nodes inherit properties from nodes of another tree (tree 311 of FIG. 3A), according to at least one embodiment. An application called SmartphoneApp2 is designed to inherit or re-use some of the configuration properties of SmartphoneApp1 in the depicted example, as indicated by the arrow labeled 333 and the "inherits from Smartphone-App1" term in the JSON representation 351 for Smartphone-App2. Within the JSON representation 351, only the elements "background.texture.color2" and "background.texture.color3" are specified, indicating that the rest of the configuration is to match that of the source JSON 301. The configuration server may store an indication of the inheritance relationship for SmartphoneApp2's tree 357 (e.g., as additional metadata for the tree or its root node). In the illustrated example, the value of "background.texture/color2" has been changed from "Gray" in the source (i.e., in node 320U of FIG. 3A) to "Blue", as indicated in overriding node 320V; accordingly, at least the new value may be stored for the tree 357. Furthermore, a new node 320W has been added, whose properties may also be stored for tree 357. For the remainder of the tree 357, in some implementations, some or all of the properties such as keys/values/metadata may not be stored, as they can be obtained by reference to the source tree 311, as indicated by the dotted line around inherited portion 361. When a client wishes to view or modify properties of the inheriting nodes (such as 320K or 320T) of tree 357, the configuration server may retrieve the data from tree 311. In some implementations at least some metadata (e.g., metadata indicating the source node) may be stored even for nodes that inherit from some other node.

Data Storage Models

Figure 4:
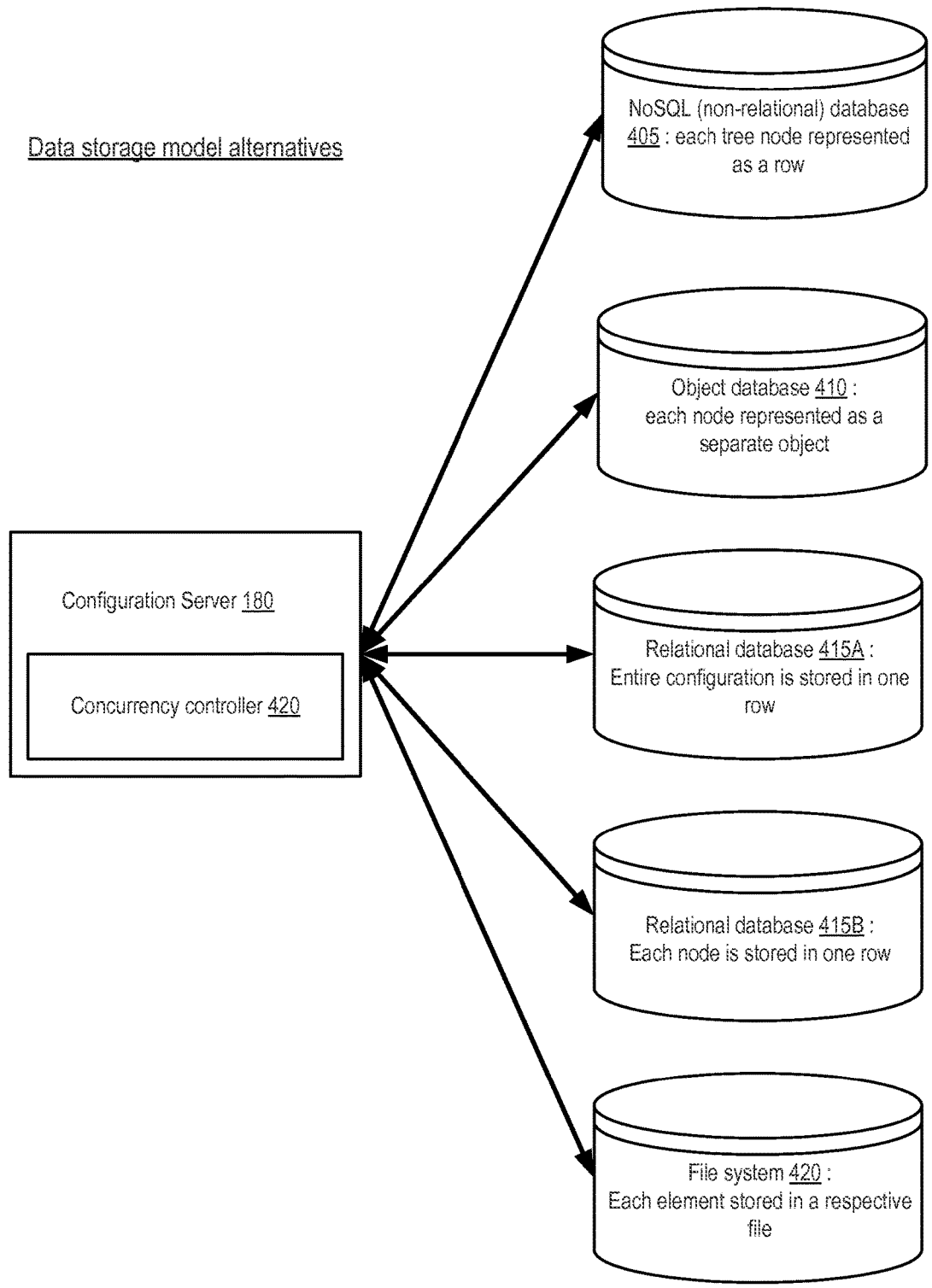
FIG. 4 illustrates examples of data storage models that may be used for storage of configuration information, according to at least some embodiments.

FIG. 4 illustrates examples of data storage models that may be used for storage of configuration information, according to at least some embodiments. Five example data storage models are shown, any of which may be used in a given implementation. In one embodiment, for example, a NoSQL non-relational database system 405 may be used, in which each tree node may be represented as a row within a database unit such as a table or row. The node's key may serve as the key for the row, while the value(s), metadata, and pointers to parent and child nodes may be stored as columns of the row. Many NoSQL implementations support dynamic additions of columns, making schema modifications easy, and the configuration manager 180 may take advantage of the ability to add columns to represent different attributes for different configuration elements. For example, in one scenario, one row in a NoSQL table may be used for a node representing configuration of a first instance of an application module, and another row may be used for a second instance. Initially, when the tree for the application is created, both rows may have the same set of columns. Later, if for example the configuration server 180 decides to add a metadata entry for the second instance, a new column with the appropriate value may simply be added on to the second row, without having to add the same column to the first row. The fast update performance of some types of NoSQL databases (in which, for example, each modification results in a new version of a row, without modifying data in place) may also prove useful in scenarios where configuration information changes rapidly over time.

In one embodiment, an object oriented database 410 may be used to store the configuration information, with each node being represented by a separate object. Relational databases 415 may be used in some implementations. For example, in one straightforward data model illustrated in 415A, the entire tree for a given application may be stored in a single row of a table of the relational database, with each node being represented by its own set of columns. In another approach, as indicated by element 415B, each node may be represented in its own row. In at least one implementation, instead of using a database system, a file system 420 may be used, where each node's information is stored in a respective file, and the hierarchy of the tree is mapped to a directory hierarchy in the file system.

The configuration server 180 may comprise a concurrency controller module 420 in some embodiments, configured to identify and manage potential conflicts between requests from different clients and/or application components or instances. The concurrency controller module 420 may in some embodiments use features of the underlying data storage system being used (such as the NoSQL database system 405, or the relational database system 415A or 415B) to manage concurrent access requests. For example, in an implementation where each node is represented using a respective row in a database table, the concurrency controller module 420 may acquire the appropriate row lock (if row locks are supported by the database system), when a request to modify a node or a set of nodes is received.

Figure 5:
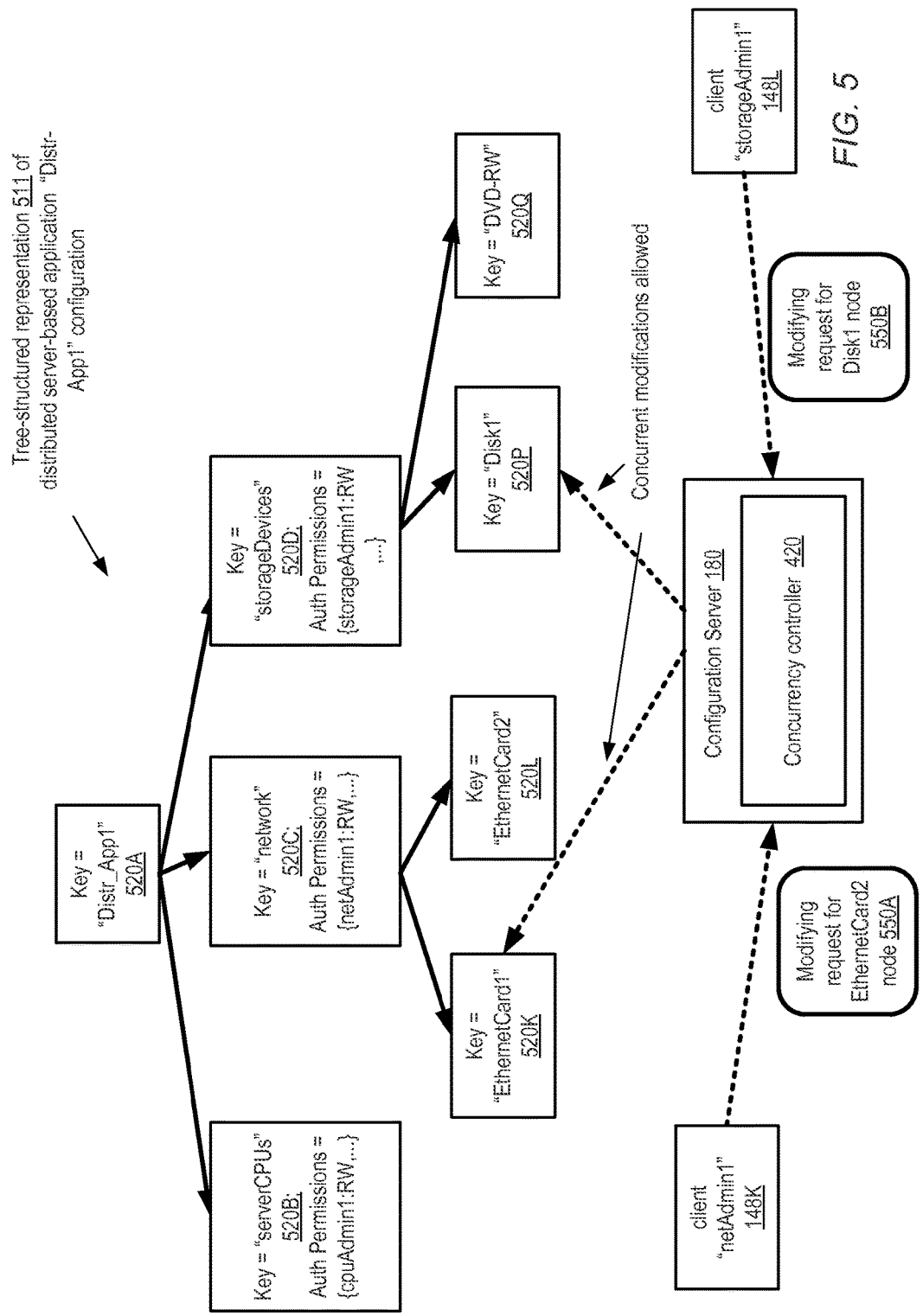
FIG. 5 illustrates an example scenario in which concurrent modifications are performed on different nodes of a configuration tree, according to at least some embodiments.

When multiple modifying requests (e.g., requests to create, delete, update, rename, or move nodes) are received in very close time proximity, and the requested operations are permitted by the authorization information associated with the tree, in some embodiments the concurrency controller module may determine whether to allow the requests to be performed concurrently or not, based for example on the relative locations of the targeted nodes within the tree and the nature of the modifying operations requested. FIG. 5 illustrates an example scenario in which concurrent modifications are performed on different nodes of a configuration tree, according to at least some embodiments.

As shown, a tree 520 representing the configuration of a distributed, server-based application "Distr_App1" is generated by the configuration server 180 in the depicted embodiment. Three child nodes 520B, 520C and 520D of the root node 520A representing "Distr_App1" are shown. Node 520B with key "serverCPUs" forms the root of a sub-tree with CPU-related configuration information (child nodes of 520A are not shown for clarity), with read and write permissions granted for the sub-tree to a client identified as "cpuAdmin1" (as indicated by the notation "Auth Permissions={cpuAdmin1:RW, . . . }"). Node 520C, with key "network" forms the root of a sub-tree devoted to network-related configuration, including for example node 520K with key "EthernetCard1" and node 520L with key "EthernetCard2". Read and write permissions for the sub-tree rooted at node 520C are granted to "netAdmin1". Node 520D, with key "storageDevices" forms the root of another sub-tree, devoted to storage-related configuration information, including for example node 520P with key "Disk1" and node 520Q with key "DVD-RW". Read and write permissions for the sub-tree rooted at node 520D are granted to "storageAdmin1". The clients identified as "cpuAdmin1", "netAdmin1" and "storageAdmin1" in the depicted example may be respective administrators of the processors, network and storage components of the devices used for the distributed server application "Distr_App1".

In the example depicted in FIG. 5, the configuration server 180 received two near-simultaneous modifying requests 550A and 550B. Request 550A, from client "netAdmin1", requests a change to node 520K (key=EthernetCard1"), while request 550B, from client "storageAdmin1", requests a modification to node 520P (key="Disk1"). In order to determine whether the operations indicated in the requests 550A and 550B should be performed, and if so, whether they may be performed concurrently (e.g., whether the operations of request 550B should be initiated prior to the completion of the operations if request 550A), the configuration server 180 may take the following steps in the depicted embodiment.

First, the authorization information associated with the affected nodes may be checked, to verify that the requesting clients are allowed to perform the specified modifications. As indicated by the authorization information for the node 520C, "netAdmin1" is permitted to modify descendant nodes of 520C, and 520K is a descendant of 520C, so "netAdmin1"'s request 550A is acceptable according to the relevant authorization information. Similarly, "storageAdmin1" is permitted to modify node 520P based on the authorization information for 520P's ancestor node 520D.

Second, in the depicted embodiment, the configuration server 180 may check that the nodes being modified as a result of the concurrent requests are not in an ancestor-descendant relationship with each other. In this case, node 520K and 520P belong to different sub-trees, and so neither affected node is a descendant or ancestor of the other. Accordingly, the modifications requested to the two nodes may be allowed to proceed concurrently. Had one of the affected nodes been an ancestor of the other, a modification such as a deletion of the ancestor node while the child node is being modified may have resulted in a corrupted tree, and the operations may have been disallowed by the concurrency control module 420. In some embodiments, the concurrency control module may allow concurrent modifications of an ancestor and a descendant, depending on exactly what type of modification is being requested—e.g., a change to the value of the descendant may be allowed concurrently with a change to the metadata of the ancestor, as long as the structure of the tree is not changed as a result of either change. By supporting client-specific authorization information for various subsets of an application's configuration data, together with concurrent modifications under certain conditions, the configuration server 180 may provide a high level of flexibility, especially for complex applications for which configuration modifications may otherwise have to be serialized.

Methods for Managing Configuration Information

Figure 6:
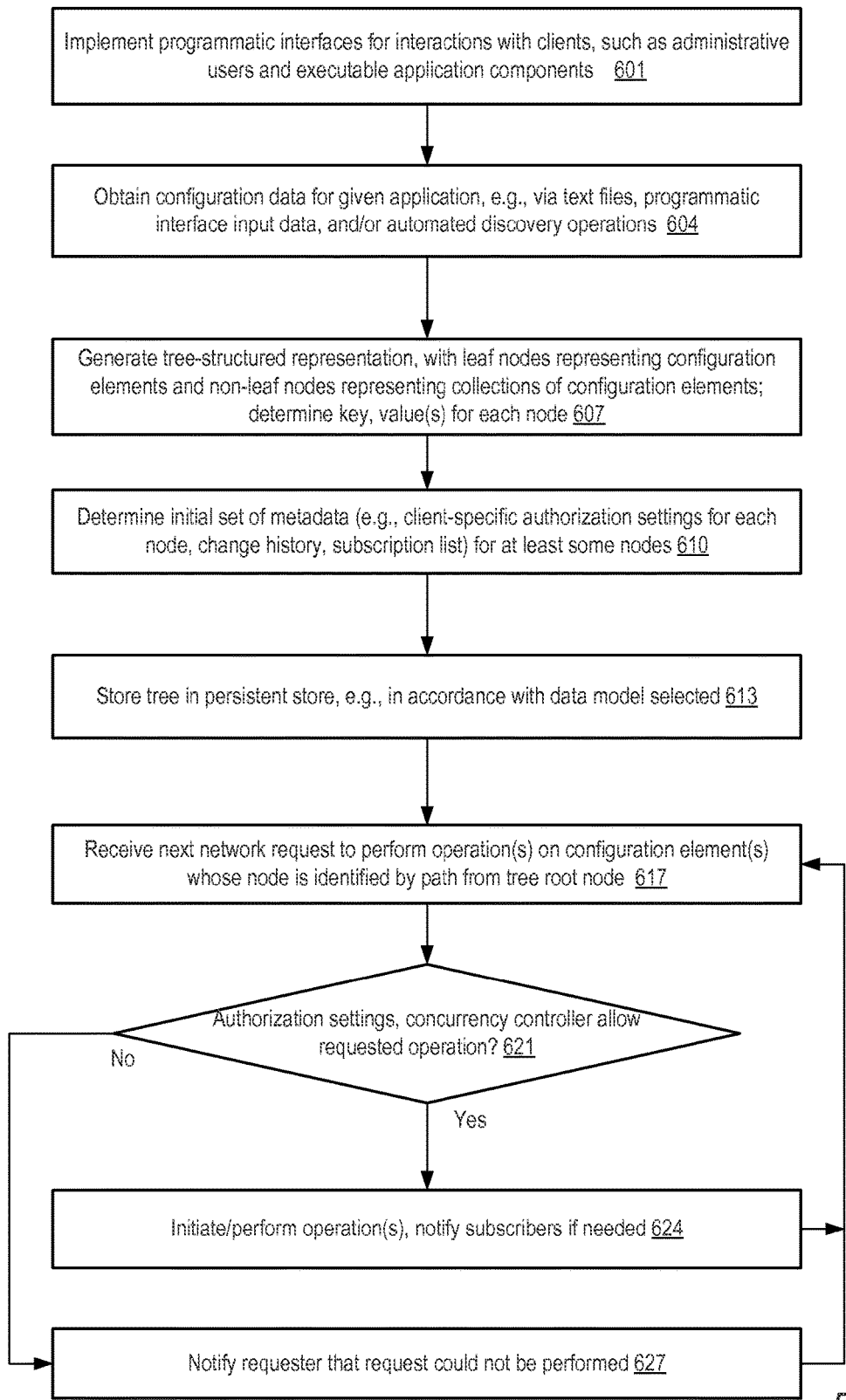
FIG. 6 is a flow diagram illustrating aspects of the operation of a configuration server, according to at least some embodiments.

FIG. 6 is a flow diagram illustrating aspects of the operation of a configuration server 180, according to at least some embodiments. As shown in element 601, one or more programmatic interfaces, such as APIs, web pages, command-line tools, or graphical user interfaces may be implemented by the configuration server 180 to support interactions with clients such as application administrators, developers, or managers, as well as interactions with executable application components or instances that may need to refresh configuration information or make changes to application configurations. The configuration server 180 may obtain configuration data for a given application from a variety of data sources, such as text configuration files provided by administrators, input provided directly via the programmatic interfaces, or using automated discovery techniques. For example, given a network address of an application component or a device on which an application component runs, an indication of the nature and/or vendor of the application (e.g., whether the application is a web application, a high-performance computing application using a well-known parallel computing approach, and so on), and credentials allowing the appropriate level of access, the configuration server 180 may establish a network connection to the application or device and examine the application configuration space to extract the required data in some embodiments.

Having obtained the configuration data for a given application, the configuration server 180 may generate a tree-structured representation of the application's configuration (element 607 of FIG. 6), e.g., comprising a plurality of non-leaf nodes and a plurality of leaf nodes, connected by parent-child edges. The leaf nodes may represent respective individual configuration elements, and the non-leaf nodes may represent collections of related elements that are represented by the non-leaf nodes' descendant nodes. For each node, in one embodiment, a key may be determined, and for at least some nodes, one or more values of the corresponding configuration data may be determined.

In at least some embodiments, metadata about the configuration element(s) represented by the nodes may also be determined (element 610 of FIG. 6). Various types of metadata may be generated in different embodiments, such as (a) change history information that identifies when and on whose behalf a node's key, value(s) or other metadata was changed, old values of the configuration data, and so on; (b) authorization information for the node, indicating which types of operations (e.g., read, create, delete, update, rename, or move operations) specified entities are permitted to perform, or are not permitted to perform; (c) expiration dates or validity periods for the values or other attributes of the node; (d) subscription information indicating for example which entities are to be notified when a node is modified, which types of modifications are to trigger such notifications, and how the notifications are to be transmitted (e.g., via email, a custom notification service, a message queue system, a smart phone notification, and so on); or (e) custom metadata such as user-defined tags, labels or notes.

As shown in element 613 of FIG. 6, the tree representation may be stored in a persistent store, using any of a number of possible data storage models similar to those illustrated in FIG. 4, such as a NoSQL database in which each node is stored in one row, or an object database, or a relational database. In some implementations all the attributes of a given node (e.g., the key itself, the value(s), metadata entries, and parent/child pointers to other nodes) may be stored together, while in other implementations some of the attributes may be stored separately (e.g., authorization information may be kept in a separately managed authorization database).

The configuration server 180 may receive network requests from various clients to perform one or more of the supported operations on the configuration, e.g., via one or more of the programmatic interfaces. A network request may specify the path from the root node of the configuration tree to the node or nodes on which the operation or operations are to be performed. For example, in one implementation, a path may be specified using concatenated strings separated by appropriate delimiters (e.g., "applicationName.node1.node2.node3" or "applicationName/node1/node2/node3"), where each string identifies a particular node of the tree along the path. When the next network request is received (element 617 of FIG. 6), the configuration server 180 may check whether the requested operations are acceptable, e.g., by consulting the relevant authorization information and/or the server's concurrency control module. If the operation is found to be acceptable (as determined in element 621), the requested operation(s) may be initiated (element 624). If one or more entities are to be notified as a result of the operation(s), e.g., if a configuration change needs to be propagated to one or more subscriber components of the application, the necessary notifications may be generated. If the requested operations cannot be performed, e.g., either due to lack of authorization or due to conflicts with other operations (as also determined in element 621), the requester may be notified (element 627) in some embodiments. Depending on the nature of the request and the reason why it is found unacceptable, in some implementations the requester may simply be asked to resubmit the request later, or the request may be delayed before the configuration server itself retries the requested operations. After the current request has been handled, the configuration server may address the next request received (element 617 onwards).

Figure 7:
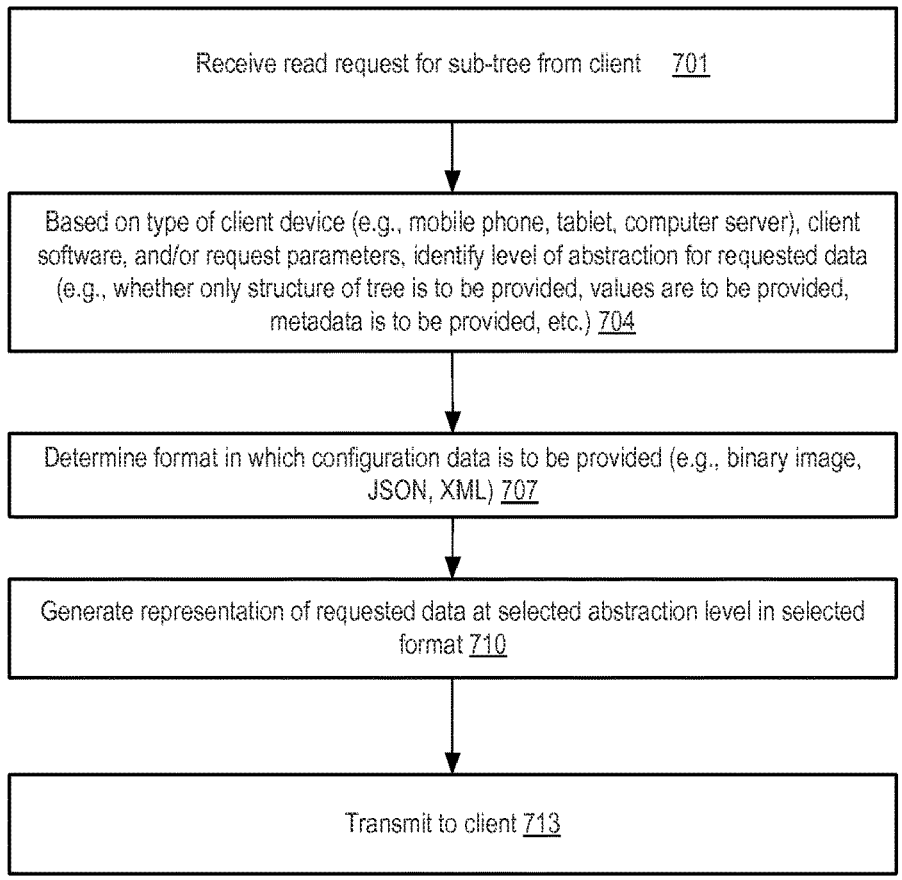
FIG. 7 is a flow diagram illustrating aspects of the operation of a configuration server configured to provide customized responses to read requests, according to at least one embodiment.

FIG. 7 is a flow diagram illustrating aspects of the operation of a configuration server 180 configured to provide customized responses to read requests, according to at least one embodiment. The devices from which various requests are received may vary in their computing power, display capabilities, and various other characteristics. Accordingly, in at least some embodiments the configuration server 180 may customize the information it provides to a client, so that for example the client's device is not overwhelmed by the amount of detail provided.

As shown in element 701, the configuration server 180 may receive a read request for a configuration sub-tree (or an entire tree) for a given application. The configuration server may be able to identify, e.g., based on one or more HTTP message headers in the case of a web request, one or more client characteristics of the client. These characteristics may include the type of device being used by the requesting client—e.g., whether the device is a smart phone, a tablet device, a laptop or personal computer, or a server and the client software (e.g., browser version in the case of web requests) being used. Based on the identified characteristics, the configuration server 180 may identify a particular level of abstraction at which the requested data is to be provided (element 704 of FIG. 7). For example, depending on the performance capabilities of an administrator's device or software, and on the total amount of configuration information available for the requested sub-tree, the configuration server may decide to initially send a condensed version of the available information, such as an image that shows the structure of the sub-tree without providing some of the details about some of the nodes of the sub-tree. In at least some implementations, if a condensed version such as an image is sent to an administrator or other user, an additional control element such as a clickable link may be provided to allow the client to request additional details. In at least some implementations, the requester may provide an indication about the level of detail that should be provided, e.g., in a parameter such as "detail=high" or "detail=medium".

In addition to determining the level of abstraction, the configuration server 180 may also determine the format in which the information is to be provided (element 707), such as XML, JSON, YAML, plain text, or an image file format such as JPEG (Joint Photographic Experts Group) or GIF (Graphics Interchange Format). This decision regarding format may also be guided by the configuration server's knowledge about the client device or software in some implementations. In other implementations, the client may indicate the desired format in the request. In some implementations, the configuration server may store configuration information in a number of different formats in its data store, so that client requests for different formats can be responded to without the delay real-time translations may otherwise require. Having determined the level of abstraction and the format, the configuration server 180 may generate the representation configuration information to be provided to the client (element 710), and transmit the representation via the appropriate interface (element 713). It is noted that not all the operations illustrated in FIG. 6 and FIG. 7 may be performed in the order shown in some embodiments, and that some of the operations may be performed in parallel in some implementations.

Example Web Interface

Figure 8:
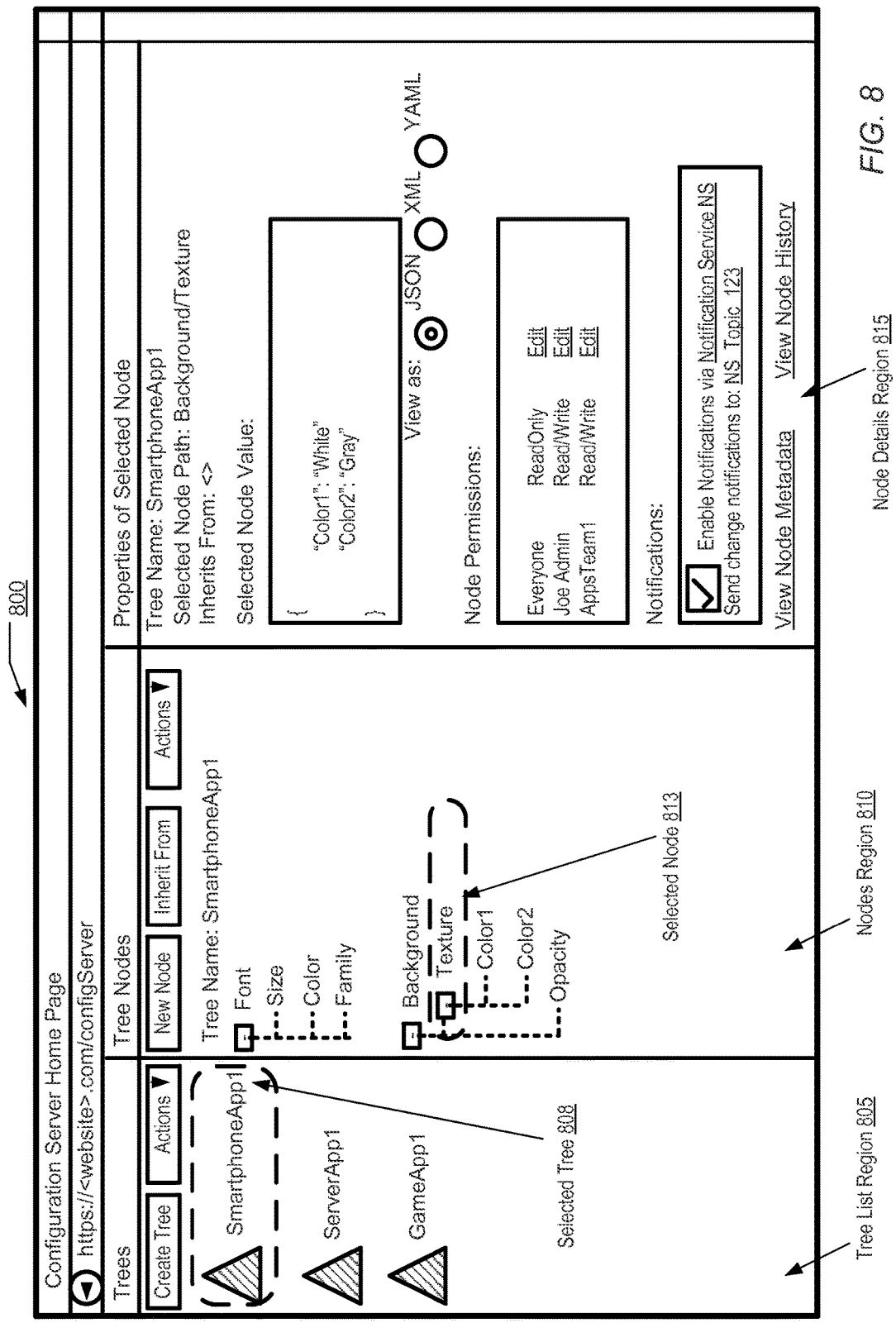
FIG. 8 illustrates an example of a web page interface that may be implemented for client interactions with a configuration server, according to at least one embodiment.

FIG. 8 illustrates an example of a web page interface that may be implemented for client interactions with a configuration server, according to at least one embodiment. As shown, the interface may include a web page 800 that is divided into three regions: a tree list region 805, a tree nodes region 810, and a node details region 815. The tree list region 805 may display a set of configuration trees, such as the three trees labeled "SmartphoneApp1", "ServerApp1" and "GameApp1". The set of trees that are selected for display in region 805 may include the trees most recently edited or viewed by the client 148, i.e., the tree listing may be customized for different clients. A client 148 may initiate the process of creating a new tree using the "Create Tree" button shown in region 805, and a number of other actions (such as tree deletion, re-ordering of the displayed trees, etc.) may be initiated using the "Actions" drop-down button in region 805 in the depicted example. To obtain information about, or make changes to, a given tree, the client may select one of the displayed trees. In the depicted example, as indicated by the dashed rounded rectangle labeled 808, the "SmartphoneApp1" tree has been selected by the client.

The tree nodes region 810 may display the current hierarchy of the nodes of the selected tree. In the depicted example, sub-trees whose root nodes are labeled "Font" and "Background" are shown for the SmartphoneApp1 application's tree. Buttons such as "New Node", "Inherit From" and "Actions" may be used by the client to initiate various node operations. Using the "Inherit From" button, a client may indicate a source node (either within the currently selected tree "SmartphoneApp1" or some other tree such as "ServerApp1" or "GameApp1") form which a node is to inherit properties. The "Texture" node has been selected by the client, as indicated by the dashed rounded rectangle labeled 813, and as a result details about the "Texture" node are displayed in the node details region 815.

A number of different properties of the selected node may be displayed in the node details region 815 in different implementations. The path to the selected node within the selected tree may be shown in some embodiments (e.g., "Background/Texture" in the depicted web page). If the selected node inherits properties from some other node, the source node may be indicated in the "Inherits From" field. Some or all of the values associated with the selected node (either the values of the selected node, or the values of the sub-tree rooted at the selected node) may be displayed, in a format specified by the client in some implementations, or in a format chosen by the configuration server 180. In the example shown, the client has selected "JSON" as the format of choice, and, accordingly, the node names and values of the sub-tree rooted at the selected "texture" node are displayed in JSON format.

Authorization information for the selected node and/or its sub-tree may also be displayed in region 815 in some implementations. As shown, for the "Texture" node, three permission entries are displayed: members of a group "EveryOne" are allowed to read the node, while user "Joe Admin" and users belonging to group "AppsTeam1" are granted read/write permissions. Clients may modify the permissions using the respective "Edit" links in the depicted embodiment. In addition, notification settings for the selected node may be displayed in region 815 in some embodiments. In the example shown, notifications via a notification service "NS" have been enabled for the selected node, and the notifications are to be sent to a specified destination "NS Topic 123" when the selected node (or nodes of its sub-tree) changes. The client may also use the links labeled "View Node Metadata" and "View Node History" to obtain additional information for the selected node in the depicted example.

It is noted that the types of operations illustrated in FIG. 8 (e.g., viewing lists of trees, modifying tree structure or individual nodes, changing authorization or notification settings, and so on) may also or instead be initiated using other interfaces, such as API calls, command-line tools, or custom GUIs, in some embodiments. Functionality similar to that of example web page 800 may be provided using a plurality of web pages in some embodiments, and different page layouts may be implemented depending on the client device or browser version in some embodiments. For example, on a smart phone, the information displayed in web page 800 may be divided into three separate views in one implementation—one for region 805, one for region 810, and one for region 815.

Use Cases

The techniques described above, of generating tree-structured representations of a variety of different types of application configurations via a multi-tenant configuration service, may prove very useful in a number of different environments. For organizations whose IT staff has to manage dozens or hundreds of applications developed by different vendors with varying approaches to configuration management, the ability to provide a unified set of interfaces for viewing and modifying configuration data, independent of the underlying data model used, may prove especially beneficial.

The flexible approach towards authorization for configuration changes may reduce the bottlenecks that may occur if the entire configuration of an application has to be locked down to make a single change. The propagation of configuration changes via subscription-based notifications, instead of for example redeploying the entire application, may reduce the amount of effort required from application users (such as phone application users) when configuration changes are made, and may improve overall customer satisfaction. In environments where many complex similarly-configured applications have to be supported (such as applications in alpha stage, beta stage etc. of a multi-stage development/deployment lifecycle), the inheritance features supported by the configuration server may help reduce resource usage for storing configuration information, and may also reduce the likelihood of errors that may have otherwise resulted as a result of having to manage almost-but-not-quite-identical configurations.

Illustrative Computer System

Figure 9:
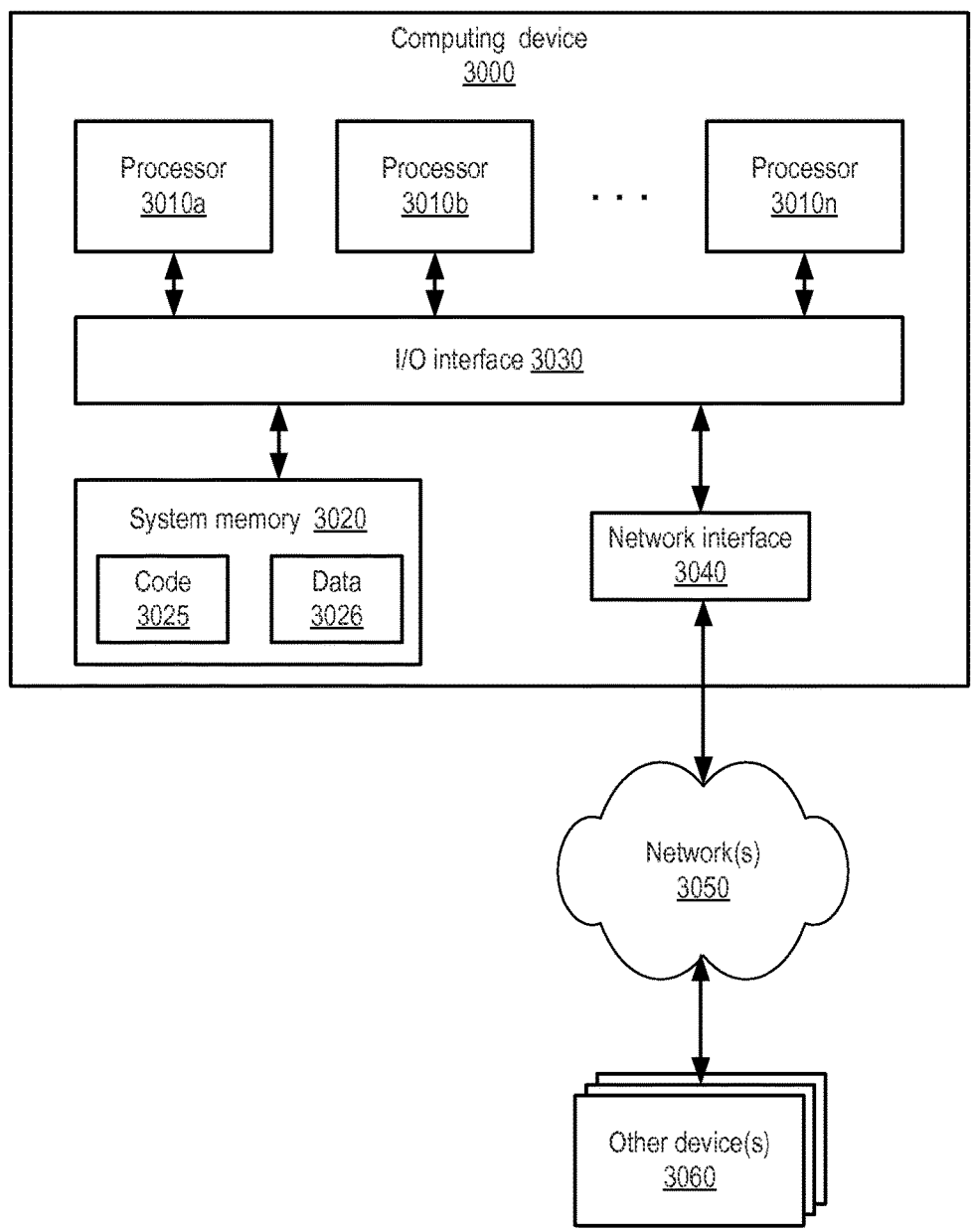
FIG. 9 is a block diagram illustrating an example computing device that may be used in some embodiments.

In at least some embodiments, a computer server that implements a portion or all of one or more of the technologies described herein, including the techniques to implement the functionality of the configuration server, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  one or more computing devices configured to implement a configuration management service that provides a service interface for a plurality of clients, wherein the configuration management service is configured to:

for the plurality of clients, generate respective tree representations of a plurality of configuration elements of a distributed application configured to execute on a plurality of execution platforms, wherein each respective tree representation comprises a plurality of non-leaf nodes and a plurality of leaf nodes, wherein each non-leaf node represents a respective collection of configuration elements, and wherein each leaf node represents a respective configuration element comprising one or more values corresponding to designs or deployment architectures of the distributed application;

for the plurality of clients, store respective authorization information for one or more nodes of each respective tree representation, wherein the respective authorization information for a particular node includes an indication of at least one respective operation that a respective client of the plurality of clients is allowed to perform on at least one configuration element in the particular node;

receive, via the service interface and from a particular client of the plurality of clients, a network request to perform a particular operation on one or more configuration elements of the respective tree representation corresponding to the particular client;

in response to (a) the network request received via the service interface to perform the particular operation on the one or more configuration elements in a specified node and (b) a determination that authorization information for the specified node permits the particular operation, initiate the particular operation on the one or more configuration elements in the specified node; and in response to (a) a first request from a first client of the plurality of clients identifying a first node of a tree representation corresponding to both the first client and a second client of the plurality of clients, and (b) a second request from the second client of the plurality of clients identifying a second node of the tree representation corresponding to both the first client and the second client, wherein the first node is not an ancestor node of the second node, and the second node is not an ancestor node of the first node, perform concurrent modifications to the first node and the second node.

2. The system as recited in claim 1, wherein multiple tree representations of the respective tree representations are connected according to a sibling relationship linking respective configuration element nodes of the multiple tree representations, wherein a node from one respective tree of the multiple tree representations inherits one or more properties from another respective tree of the multiple tree representations, and wherein the one or more computing devices are further configured to:

store, for a given node of the respective tree representation corresponding to the particular client, one or more of: (a) a key that identifies one or more configuration elements associated with the given node (b) a value of a configuration element associated with the given node and (c) metadata for a configuration element associated with the given node.

3. The system as recited in claim 2, wherein the metadata indicates one or more of: (a) a time at which a value of a configuration element associated with the given node changed (b) an identification of an entity that changed the value of a configuration element associated with the given node (c) a previous value of the configuration element associated with the given node or (d) a validity expiration time for a value of a configuration element associated with the given node (e) subscriber information of entities to which notifications of configuration changes are to be provided, or (f) customized client-generated metadata fields.

4. The system as recited in claim 1, wherein the one or more computing devices are further configured to:

generate, in response to a translation request comprising an indication of the particular node and a desired format, a representation in the desired format of configuration information associated with at least a portion of a sub-tree rooted at the particular node.

5. A method, comprising:

for a plurality of clients of a configuration management service, generating respective tree representations of a plurality of configuration elements of a distributed application configured to execute on a plurality of execution platforms, wherein each tree representation comprises a plurality of non-leaf nodes and a plurality of leaf nodes, wherein each non-leaf node represents a respective collection of configuration elements, and wherein each leaf node represents a respective configuration element comprising one or more values corresponding to designs or deployment architectures of the distributed application;

receiving, via a service interface and from a particular client of the plurality of clients, a network request to perform an operation on one or more configuration elements of the respective tree representation corresponding to the particular client;

in response to (a) the network request received via the service interface to perform the operation on the one or more configuration elements in a specified node and (b) a determination that authorization information for the specified node permits the particular operation, performing the operation on the one or more configuration elements in the specified node; and in response to (a) a first request from a first client of the plurality of clients identifying a first node of a tree representation corresponding to the first client and a second client of the plurality of clients, and (b) a second request from the second client of the plurality of clients identifying a second node of the tree representation corresponding to both the first client and the second client, wherein the first node is not an ancestor node of the second node, and the second node is not an ancestor node of the first node, performing concurrent modifying operations to the first node and the second node.

6. The method as recited in claim 5, further comprising:

storing, for a given node of the respective tree representation corresponding to the particular client, one or more of: (a) a key that identifies one or more configuration elements associated with the given node (b) a value of a configuration element associated with the given node and (c) metadata for a configuration element associated with the given node.

7. The method as recited in claim 6, wherein the metadata indicates one or more of: (a) a time at which a value of a configuration element associated with the given node changed (b) an identification of an entity that changed the value of a configuration element associated with the given node (c) a previous value of the configuration element associated with the given node (d) a validity expiration time for a value of a configuration element associated with the given node (e) subscriber information of entities to which notifications of configuration changes are to be provided, or (f) customized client-generated metadata fields.

8. The method as recited in claim 6, further comprising:
storing the value and the metadata for the given node in a record of a non-relational database object, wherein the record is uniquely identified within the object by the key, and wherein multiple, different records may be independently and concurrently accessible.

9. The method as recited in claim 5, wherein the particular operation comprises one or more of: (a) a read operation directed at a single configuration element represented by the specified node, (b) a read operation directed at a plurality of configuration elements represented by a sub-tree rooted at the specified node, (c) a modifying operation, comprising a creation, update, rename or delete, directed at a single configuration element represented by the specified node or (d) a modifying operation comprising creations, updates, renames or deletes directed at a plurality of configuration elements represented by a sub-tree rooted at the specified node.

10. The method as recited in claim 5, further comprising:
providing, in response to a translation request comprising an indication of the particular node and a desired format, a representation in the desired format of configuration information associated with at least a portion of a sub-tree rooted at the particular node.

11. The method as recited in claim 10, wherein the desired format comprises one of: a JavaScript™ Object Notation (JSON) format, an Extensible Markup Language (XML) format, or a YAML data serialization format.

12. The method as recited in claim 5, further comprising:
receiving as input a file comprising one or more changes to configuration of the distributed application;
parsing the file to identify one or more nodes of each respective tree representation to be modified in accordance with the one or more changes; and
modifying the one or more nodes in accordance with the one or more changes.

13. The method as recited in claim 5, wherein the distributed application comprises a plurality of application components instantiated at the plurality of execution platforms, further comprising:
implementing a subscription interface allowing an indication of an execution platform to which a notification is to be provided when the value of the configuration element associated with the specified node changes; and
transmitting, to one or more execution platforms of the plurality of execution platforms for which subscription requests are received via the subscription interface, a notification indicating a change to the value of the configuration element associated with the specified node.

14. The method as recited in claim 5, wherein said generating the tree-structured representation comprises:
receiving a request from the particular client to inherit one or more properties of a particular node of the tree representation corresponding to the particular client from a specified source node of another tree representation corresponding to another client; and
storing a representation of an inheritance relationship between the source node and the particular node, indicating that in response to a request for a value of a property of the one or more properties of the particular node, the value is to be retrieved from the source node.

15. The method as recited in claim 14, wherein the source node is part of a different tree than the particular node.

16. A non-transitory computer-accessible storage medium storing program instructions that when executed on one or more processors implement a configuration management service that provides a service interface for a plurality of clients, wherein the configuration management service is configured to:
generate, for the plurality of clients, respective tree representations of a plurality of configuration elements of an application, wherein each respective tree representation comprises a plurality of non-leaf nodes and a plurality of leaf nodes, wherein each non-leaf node represents a respective collection of configuration elements, and wherein each leaf node represents a respective configuration element comprising one or more values corresponding to designs or deployment architectures of the application;
receiving, via the service interface and from a particular client of the plurality of clients, a network request to perform an operation on one or more configuration elements of the respective tree representation corresponding to the particular client;
in response to (a) the network request received via the service interface to perform the operation on the one or more configuration elements in a specified node and (b) a determination that authorization information for the specified node permits the particular operation, initiate the operation on the one or more configuration elements in the specified node; and
in response to (a) a first request from a first client of the plurality of clients identifying a first node of a tree representation corresponding to both the first client and a second client of the plurality of clients, and (b) a second request from the second client of the plurality of clients identifying a second node of the tree representation corresponding to both the first client and the second client, wherein the first node is not an ancestor node of the second node, and the second node is not an ancestor node of the first node, perform concurrent modifications to the first node and the second node.

17. The storage medium as recited in claim 16, wherein the instructions when executed on the one or more processors:
store, for a given node of the respective tree representation corresponding to the particular client, one or more of: (a) a key that identifies one or more configuration elements associated with the given node (b) a value of a configuration element associated with the given node and (c) metadata for a configuration element associated with the given node.

18. The storage medium as recited in claim 17, wherein the metadata indicates one or more of: (a) a time at which a value of a configuration element associated with the given node changed (b) an identification of an entity that changed the value of a configuration element associated with the given node (c) a previous value of the configuration element associated with the given node (d) a validity expiration time for a value of a configuration element associated with the given node (e) subscriber information of entities to which notifications of configuration changes are to be provided, or (f) customized client-generated metadata fields.

19. The storage medium as recited in claim 16, wherein the operation comprises one or more of: (a) a read operation directed at a single configuration element represented by the specified node, (b) a read operation directed at a plurality of configuration elements represented by a sub-tree rooted at the specified node, (c) a modifying operation, comprising a creation, update, rename or delete, directed at a single configuration element represented by the specified node or (d) a modifying operation comprising creations, updates, renames or deletes directed at a plurality of configuration elements represented by a sub-tree rooted at the specified node.

20. The storage medium as recited in claim 16, wherein the instructions when executed on the one or more processors:

receive as input a file comprising one or more changes to configuration of the distributed application;

parse the file to identify one or more nodes of each respective tree representation to be modified in accordance with the one or more changes; and modify the one or more nodes in accordance with the one or more changes.

21. The storage medium as recited in claim 16, wherein the distributed application comprises a plurality of application components instantiated at the plurality of execution platforms, wherein the instructions when executed on the one or more processors:

implement a subscription interface allowing an indication of an execution platform to which a notification is to be provided when the configuration element associated with the specified node changes; and transmit, to one or more execution platforms of the plurality of execution platforms for which subscription requests are received via the subscription interface, a notification indicating a change to the configuration element associated with the specified node.

22. The storage medium as recited in claim 16, wherein the application comprises a plurality of application components instantiated at the plurality of execution platforms, wherein the plurality of execution platforms comprises one or more of: a phone, a tablet computer, a personal computer, or a server computer system.

23. The storage medium as recited in claim 16, wherein the application comprises a network-accessible infrastructure service providing to the plurality of clients one or more of: (a) virtualized compute servers (b) virtualized storage servers.

24. The storage medium as recited in claim 16, wherein the application comprises a web page rendering application, wherein at least one configuration element comprises configuration of a style sheet used to render a web page.

\* \* \* \* \*